United States Patent Office 3,043,836
Patented July 10, 1962

3,043,836
13β-CARBOXY-17β-HYDROXY - 10β - METHYLGON-4-EN-3-ONE, DERIVATIVES THEREOF AND INTERMEDIATES THERETO
Raphael Pappo, Skokie, Ill., assignor to G. D. Searle & Co., Chicago, Ill., a corporation of Delaware
No Drawing. Filed May 2, 1961, Ser. No. 107,043
12 Claims. (Cl. 260—239.57)

The present invention is concerned with novel steroids of the gon-4-en-3-one series, and more particularly, with 13β-carboxy-17β-hydroxygon-4-en-3-one and derivatives thereof, as represented by the structural formulae

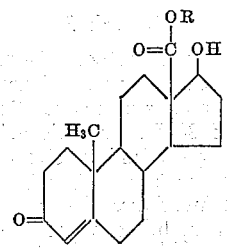

and

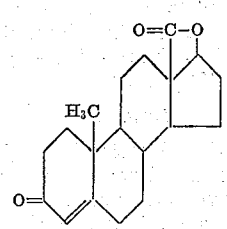

wherein R is hydrogen or a lower alkyl radical. A further object of this invention is to provide novel intermediates useful in the manufacture of the compounds of the foregoing structural formulae. These intermediates are represented by the structural formulae

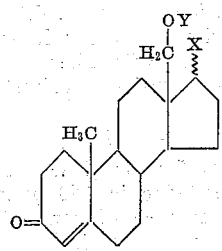

and

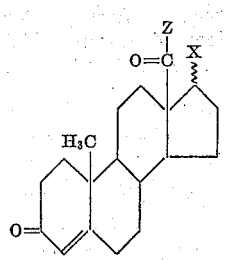

wherein X is a halogen atom, Y is hydrogen or a lower alkanoyl radical, and Z is hydrogen, hydroxy, or a lower alkoxy radical.

Examples of the lower alkyl radicals designated by R are methyl, ethyl, propyl, butyl, pentyl, hexyl, and the branched-chain isomers thereof. The lower alkanoyl radicals encompassed by Y are typified by formyl, acetyl, propionyl, butyryl, valeryl, caproyl, and their branched-chain isometers, said groups being the acyl radicals of alkanoic acids containing fewer than 7 carbon atoms. The lower alkoxy radicals represented by Y are, for example, methoxy, ethoxy, propoxy, butoxy, pentyloxy, hexyloxy, and the branched-chain isomers thereof.

This application is a continuation-in-part of my co-pending application, Serial No. 41,732, filed July 11, 1960, and now abandoned.

Starting materials suitable for the manufacture of the instant compounds are 18,20-epoxy-20-hyroxypregn-4-en-3-one and 18,20-epoxypregna-4,20-dien-3-one. Treatment of either of the latter substances with hydrogen peroxide in a suitable solvent medium in the presence of an acid catalyst results in 18,20-epoxypregn-4-en-3-one 20-hydroperoxide. Treatment of this hydroperoxide with methanesulfonyl chloride produces 18-acetoxy-17α-chloroandrost-4-en-3-one. Treatment of the latter chloro compound with lithium chloride results in the instant 18-acetoxy-17β-chloroandrost-4-en-3-one while reaction with lithium bromide or lithium iodide affords the 17α- and 17β- isomers of 18-acetoxy-17-bromoandrost-4-en-3-one and 18-acetoxy-17-iodoandrost-4-en-3-one, respectively. Reaction of the aforementioned 17α-chloro compound with silver fluoride produces the 17α- and 17β- stereoisomers of 18-acetoxy-17-fluoroandrost-4-en-3-one. An alternate process particularly suitable for the manufacture of the instant 17-iodo compounds involves conversion of the aforementioned 18,20-epoxypregn-4-en-3-one 20-hydroperoxide to the corresponding acetate by treatment with acetic anhydride in pyridine. Reaction of this acetate with sodium iodide, preferably in the presence of triethylamine, affords 18-acetoxy-17α-iodoandrost-4-en-3-one.

Mild hydrolysis of the aforementioned 18-acetoxy-17-haloandrost-4-en-3-ones results in the corresponding 17-halo-18-hydroxy compounds. Typically, 18-acetoxy-17α-chloroandrost-4-en-3-one is treated with p-toluene-sulfonic acid in aqueous methanol to produce 17α-chloro-18-hydroxyandrost-4-en-3-one. Acylation of these 18-hydroxy compounds affords the corresponding 18-(lower alkanoates) as is exemplified by reaction of the latter 17α-chloro-18-hydroxyandrost-4-en-3-one with propionic anhydride in pyridine to yield 17α-chloro-18-propionoxyandrost-4-en-3-one. Oxidation of the aforementioned 17-halo-18-hydroxy compounds with a limited quantity of oxidizing agent results in the corresponding 18-oxo compounds, while the use of excess oxidant affords the 13β-carboxy derivatives. These processes are specifically illustrated by the reaction of 17α-chloro-18-hydroxyandrost-4-en-3-one with one molecular equivalent of aqueous chromic acid to produce 17α-chloro-18-oxoandrost-4-en-3-one, or with slightly more than two molecular equivalents of that reagent to afford 13β-carboxy-17α-chloro-10β-methylgon-4-en-3-one. Reaction of these 13β-carboxy compounds with a diazoalkane affords the corresponding 13β-carbalkoxy compounds as is illustrated by the preparation of 13β-carbomethoxy-17α-chloro-10β-methylgon-4-en-3-one by the reaction of 13β-carboxy-17α-chloro-10β-methylgon-4-en-3-one with diazomethane in ether.

The instant 13β-carboxy-17β-hydroxy-10β-methylgon-4-en-3-one lactone is obtained by treatment of the corresponding 17-halo compounds described supra with aqueous alkali. As a specific example, 13β-carboxy-17α-chloro-10β-methylgon-4-en-3-one is allowed to react with aqueous sodium hydroxide and ether to produce the latter lactone. Further reaction of this lactone with aqueous sodium hydroxide followed by acidification with dilute hydrochloric acid produces the hydroxy-acid, 13β-carboxy - 17β - hydroxy - 10β - methylgon - 4 - en - 3-one. This hydroxy-acid is converted to the instant 13β-carbalkoxy-17β-hydroxy compounds by reaction with the appropriate diazoalkane. For example, a solution of 13β - carboxy - 17β - hydroxy - 10β - methylgon - 4 - en-3-one in methanol is allowed to react with ethereal diazomethane to yield 13β-carbomethoxy-17β-hydroxy-10β-methylgon-4-en-3-one.

The compounds of the present invention exhibit valuable pharmacological properties. They are, for example, anti-hormonal agents as evidenced by their ability to inhibit the sodium-retaining activity of desoxycorticosterone actate. In addition, as is described supra, the instant 17-halo compounds are useful as intermediates in the manufacture of the 17-oxygenated compounds of this invention.

The invention will appear more fully from the examples which follow. These examples are set forth by way of illustration only and it will be understood that the invention is not to be construed as limited in spirit or in scope by the details contained therein, as many modifications in materials and methods will be apparent from this disclosure to those skilled in the art. In these examples temperatures are given in degrees centigrade (° C.) and quantities of materials in parts by weight, unless otherwise noted.

*Example 1*

Method A.—A solution of 12.4 parts of 18,20-epoxy-20-hydroxypregn-4-en-3-one in 270 parts of warm benzene is cooled and diluted with 360 parts of ether. The mixture is cooled to about 5°, then treated successively with 15 parts of 90% aqueous hydrogen peroxide and 0.28 part of p-toluenesulfonic acid monohydrate. Stirring is continued for about one hour at 5°. The resulting precipitate is collected by filtration, washed with ether, and dried to afford 18,20-epoxypregn-4-en-3-one 20-hydroperoxide, M.P. 185–190° (dec.). It displays infrared maxima at 3.60, 6.0, and 11.5 microns.

Method B.—The substitution of an equivalent quantity of 18,20-epoxypregna-4,20-dien-3-one for 18,20-epoxy-20-hydroxypregn-4-en-3-one in the process described under Method A results also in 18,20-epoxypregn-4-en-3-one 20-hydroperoxide.

Method C.—To a solution of 50.56 parts of 18,20-epoxy-20-hydroxypregn-4-en-3-one in 567 parts of warm dioxane is added 0.98 part of p-toluenesulfonic acid monohydrate. The resulting mixture is cooled to room temperature, then treated with 111.2 parts of 30% aqueous hydrogen peroxide over a period of about 2 minutes. Stirring is continued for about one hour at 0–5°; and the resulting precipitate is collected by filtration, washed successively with dioxane and ether, and dried to afford 18,20-epoxypregn-4-en-3-one 20-hydroperoxide, identical with the product obtained by the procedure of Method A supra.

*Example 2*

To a solution of 14.8 parts of methanesulfonyl chloride in 55 parts of anhydrous pyridine, cooled to 0–5°, is added 5.53 parts of 18,20-epoxypregn-4-en-3-one 20-hydroperoxide. The reaction mixture is stirred until homogeneity is achieved, allowed to stand at 5° for about 4 hours, then treated successively with ice and ether. The resulting mixture is extracted with an ether-benzene solution and the organic extract is washed successively with hydrochloric acid, water, aqueous sodium hydroxide, and water; dried over anhydrous sodium sulfate, and evaporated to dryness at reduced pressure. The residue is dissolved in benzene and adsorbed on silica gel.

The chromatographic column is eluted with 20% ether in benzene to afford 18-acetoxy-17α-chloroandrost-4-en-3-one, which exhibits maxima in the infrared at 3.4, 5.75, 6.0, 7.23, 8.0, and 9.65 microns.

*Example 3*

A mixture of 5.07 parts of 18-acetoxy-17α-chloro-androst-4-en-3-one, 5 parts of p-toluenesulfonic acid monohydrate, 400 parts of methanol, and 20 parts of water is allowed to stand at room temperature for about 4 days, then concentrated to a small volume in vacuo. The residue is extracted with benzene and the organic layer separated, washed successively with aqueous potassium bicarbonate and water, dried over anhydrous sodium sulfate, and concentrated to afford a crystalline residue. Recrystallization from benzene affords pure 17α - chloro - 18 - hydroxyandrost - 4 - en - 3 - one, M.P. 205–210° (dec.).

*Example 4*

A mixture of one part of 17α-chloro-18-hydroxyandrost-4-en-3-one, 13 parts of propionic anhydride, and 20 parts of pyridine is allowed to stand at room temperature for about 16 hours, then diluted with water and extracted with benzene. The benzene solution is washed successively with dilute hydrochloric acid and water, dried over anhydrous sodium sulfate, and evaporated to dryness in vacuo to afford 17α-chloro-18-propionoxy-androst-4-en-3-one.

*Example 5*

To a solution of one part of 17α-chloro-18-hydroxyandrost-4-en-3-one in 120 parts of acetone is added 2 parts by volume of an aqueous solution, 8 N in chromium trioxide and 8 N in sulfuric acid. The mixture is stirred at room temperature for about one hour, treated with 0.5 part of isopropanol, and concentrated to a small volume at room temperature, under nitrogen. The residue is extracted with benzene and the benzene extract washed with water, dried over anhydrous sodium sulfate, and evaporated to dryness under reduced pressure. The solid residue is crystallized from ether to yield pure 13β - carboxy - 17α - chloro - 10β - methylgon - 4 - en-3-one, M.P. 214–220° (dec.).

*Example 6*

To a solution of 1.06 parts of 17α-chloro-18-hydroxyandrost-4-en-3-one in 120 parts of acetone is added dropwise, 1.4 parts by volume of an aqueous solution, 8 N in chromium trioxide and 8 N in sulfuric acid, and the mixture is stirred at room temperature for about 5 minutes. A few drops of isopropanol are added to destroy the excess chromium trioxide and the mixture is evaporated to a small volume in vacuo. The residue is extracted with benzene and this extract washed successively with aqueous sodium hydroxide and water, dried over anhydrous sodium sulfate, and evaporated to dryness in vacuo. Trituration of the residue with ether results in crystallization of pure 17α-chloro-18-oxoandrost-4-en-3-one, M.P. 112–125°.

*Example 7*

To a solution of 5 parts of 13β-carboxy-17α-chloro-10β-methylgon-4-en-3-one in 160 parts of methanol is added dropwise an ethereal solution of diazomethane until excess reagent is present, as evidenced by the persistence of a yellow color. Evaporation of the reaction mixture to dryness in vacuo affords 13β-carbomethoxy-17α-chloro-10β-methylgon-4-en-3-one, which displays infrared maxima at 3.41, 3.49, 5.8, 5.99, 6.2, 9.65, and 11.5 microns.

By substituting equivalent quantities of diazoethane and ethanol for diazomethane and methanol, respectively, in the process of this example, 13β-carbethoxy-17α-chloro-10β-methylgon-4-en-3-one is obtained.

*Example 8*

A mixture of 2.334 parts of 18,20-epoxypregn-4-en-3-one 20-hydroperoxide, 12 parts of pyridine, and 5 parts of acetic anhydride is stirred until the mixture becomes homogeneous. It is stored at room temperature for about 1½ hours, then at 0–5° for about 15 hours, and stirred and treated with about 20 parts of ice. The resulting crystalline precipitate is collected by filtration, washed successively with ice-cold aqueous pyridine and water, then extracted with ether-benzene. The organic layer is separated, washed successively with water, aqueous sodium hydroxide and water, dried over anhydrous sodium sulfate, and evaporated to dryness in vacuo to produce a crystalline residue. Recrystallization of this residue from acetone-ether affords small prisms of 18,20-epoxypregn-4-en-3-one 20-hydroperoxide acetate, M.P. about 110–114° (dec.).

*Example 9*

A mixture of 2 parts of 18,20-epoxypregn-4-en-3-one 20-hydroperoxide acetate, 11.2 parts of acetone, 0.9 part of triethylamine, 4 parts of dried sodium iodide, and 0.2 part of water is stirred at room temperature for about 6 hours, then diluted with benzene. The diluted mixture is washed successively with water, aqueous sodium bisulfite, aqueous sodium hydroxide, aqueous hydrochloric acid, and water, then dried over anhydrous sodium sulfate. The solvent is removed by distillation at reduced pressure, and the resulting residue is chromatographed on silica gel. Elution with 10% ether in benzene produces crude 18-acetoxy-17α-iodoandrost-4-en-3-one. Recrystallization of the crude product from ether results in the pure material, M.P. about 158–160°. Further recrystallization from ethanol affords material melting at about 159.5–160.5°.

*Example 10*

To a mixture of one part of anhydrous lithium bromide and 20 parts of ice-cold pyridine is added successively a solution of 3 parts of methanesulfonic anhydride in 13.3 parts of dry tetrahydrofuran and a solution of one part of 18,20-epoxypregn-4-en-3-one 20-hydroperoxide in 20 parts of pyridine. The addition of the latter solution is conducted at about 0–5° with stirring. The reaction mixture is stirred for about 5 hours at 0–5°, then is treated with ice and stirred for about one hour longer. This aqueous mixture is extracted with ether-benzene, and the organic layer is separated, washed successively with dilute hydrochloric acid, water, and aqueous sodium hydroxide, then dried over anhydrous sodium sulfate. The solvent is distilled under reduced pressure, and the gummy residue is dissolved in benzene. Chromatography of the benzene solution on silica gel followed by elution of the column with 20% ether in benzene affords 18-acetoxy-17α-bromoandrost-4-en-3-one as an oil. This substance displays infrared absorption maxima at about 5.75 and 6.0 microns.

*Example 11*

To a solution of 5 parts of 18-acetoxy-17α-iodoandrost-4-en-3-one in 400 parts of methanol containing 20 parts of water is added 5 parts of p-toluenesulfonic acid, and this mixture is stored at room temperature for about 48 hours, then diluted with about 100 parts of water, and concentrated at reduced pressure. The residual solution is extracted with benzene, and the organic layer is separated, washed successively with water, aqueous potassium bicarbonate and water, then dried over anhydrous sodium sulfate. Concentration of the organic solution to dryness affords a residue, which is crystallized from ether to produce 18-hydroxy-17α-iodoandrost-4-en-3-one. Further recrystallization from alcohol affords prisms of the pure product, M.P. about 156–161° (dec.).

*Example 12*

To a solution of 2.7 parts of 18-hydroxy-17α-iodoandost-4-en-3-one in 400 parts of acetone is added 6.5 parts by volume of an aqueous solution, 8 N in chromium trioxide and 8 N in sulfuric acid. The addition is carried out at room temperature over a period of about 10 minutes. Approximately 0.1 part of isopropyl alcohol is added to destroy the excess reagent, and the mixture is then concentrated to a small volume under nitrogen. The resulting solution is extracted with benzene, and the benzene extract is washed with water, then concentrated to dryness under reduced pressure. The resulting residue is triturated with ether to produce 17α-iodo-18-oxoandrost-4-en-3-one.

The ethereal mother liquor is chromatographed on silica gel. Elution of the column with 50% ether in benzene and with pure ether affords 13β-carboxy-17α-iodo-10β-methylgon-4-en-3-one.

The crude 17α-iodo-18-oxoandrost-4-en-3-one is dissolved in benzene-ether, then washed with dilute aqueous sodium hydroxide. Concentration of the organic layer to dryness under reduced pressure, and recrystallization of the resulting residue from isopropyl alcohol produces the pure aldehyde, M.P. about 159–163°.

*Example 13*

A suspension of 9.4 parts of 13β-carboxy-17α-chloro-10β-methylgon-4-en-3-one in 100 parts of aqueous sodium hydroxide, at pH 9–10, is shaken with 140 parts of ether. The ether layer is separated and evaporated to dryness to afford a crystalline residue, which is triturated with ether, resulting in 13β-carboxy-17β-hydroxy-10β-methylgon-4-en-3-one lactone, M.P. about 161–170°. Recrystallization from benzene-methylcyclohexane yields small prisms, M.P. about 167–177° (dec.). Infrared maxima are observed at about 5.55, 6.00, and 6.20 microns.

*Example 14*

The mother liquors from Example 13 are evaporated to dryness and the residue is dissolved in 160 parts of isopropyl alcohol. To the resulting solution is added 50 parts of 5% aqueous sodium hydroxide, and this mixture is allowed to stand at room temperature for about one hour, then diluted with water and extracted with benzene. The organic layer is evaporated to dryness, and the resulting residue is crystallized from benzene-hexane to afforded 10β-methylgona-4,13(17)-dien-3-one, M.P. about 117–121°. Recrystallization from methanol affords material, melting at about 120–123°. It displays maxima in the infrared at about 3.28, 6.00 and 6.20 microns.

*Example 15*

The aqueous alkaline solutions from Examples 13 and 14 are combined and acidified to pH 4 by the addition of dilute hydrochloric acid. The resulting cloudy suspension is extracted with chloroform, and the organic layer is washed with water, dried over anhydrous sodium sulfate, and evaporated to dryness to yield 13β-carboxy-17β-hydroxy-10β-methylgon-4-en-3-one, which exhibits infrared maxima at about 2.8–3.0, 5.85, 6.00, and 6.20 microns.

*Example 16*

To a solution of 1.5 parts of 13β-carboxy-17β-hydroxy-10β-methylgon-4-en-3-one in 40 parts of methanol is added an excess of ethereal diazomethane. This mixture is kept at room temperature for several minutes, then concentrated to dryness at reduced pressure to afford 13β-carbomethoxy-17β-hydroxygon-4-en-3-one, which is characterized by infrared maxima at about 2.85, 5.80, 6.00, and 6.20 microns.

The substitution of an equivalent quantity of diazoethane in the process of this example affords 13β-carbethoxy-17β-hydroxy-10β-methylgon-4-en-3-one.

What is claimed is:

1. A compound of the structural formula

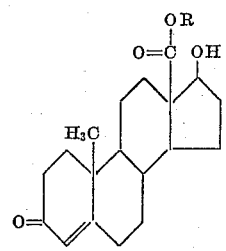

wherein R is selected from the group consisting of hydrogen and lower alkyl radicals.

2. 13β-carboxy-17β-hydroxy-10β-methylgon-4-en-3-one.

3. 13β-carboxy-17β-hydroxy-10β-methylgon-4-en-3-one lactone.

4. A member selected from the group consisting of compounds of the structural formulae

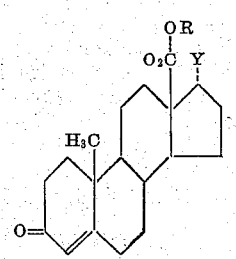

and

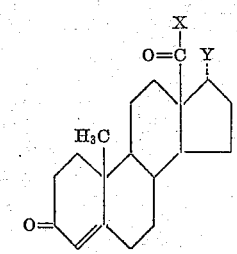

wherein R is selected from the group consisting of hydrogen and lower alkanoyl radicals, X is selected from the group consisting of hydrogen, hydroxy, and lower alkoxy radicals, and Y is a halogen atom.

5. 17α-chloro-18-hydroxyandrost-4-en-3-one.
6. 18-acetoxy-17α-chloroandrost-4-en-3-one.
7. 17α-chloro-18-oxoandrost-4-en-3-one.
8. 13β-carboxy-17α-chloro-10β-methylgon-4-en-3-one.
9. 18-acetoxy-17α-iodoandrost-4-en-3-one.
10. 18-hydroxy-17α-iodoandrost-4-en-3-one.
11. 17α-iodo-18-oxoandrost-4-en-3-one.
12. 13β-carboxy-17α-iodo-10β-methylgon-4-en-3-one.

No references cited.

UNITED STATES PATENT OFFICE
CERTIFICATE OF CORRECTION

Patent No. 3,043,836                                July 10, 1962

Raphael Pappo

It is hereby certified that error appears in the above numbered patent requiring correction and that the said Letters Patent should read as corrected below.

Column 1, line 70, for "isometers" read -- isomers --; column 2, line 64, for "lacetone" read -- lactone --; column 3, line 33, for "3.60" read -- 3.0 --; column 4, line 16, for "propionoxy-androst" read -- propionoxyandrost --; column 6, lines 32 and 33, for "afforded" read -- afford --; column 7, lines 12 to 23, the formula should appear as shown below instead of as in the patent:

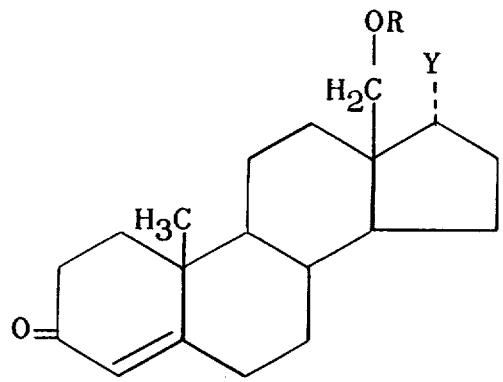

Signed and sealed this 30th day of July 1963.

(SEAL)
Attest:

ERNEST W. SWIDER                                        DAVID L. LADD

Attesting Officer                                          Commissioner of Patents